US006972771B2

(12) United States Patent
Nakano et al.

(10) Patent No.: US 6,972,771 B2
(45) Date of Patent: Dec. 6, 2005

(54) IMAGE DISPLAY DEVICE, IMAGE DISPLAY METHOD, AND IMAGE DISPLAY PROGRAM

(75) Inventors: Masayoshi Nakano, Machida (JP); Takahide Wada, Yokohama (JP); Hidetoshi Mori, Yamato (JP); Jon Earl Graham, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/382,567

(22) Filed: Mar. 6, 2003

(65) Prior Publication Data

US 2003/0179219 A1 Sep. 25, 2003

(30) Foreign Application Priority Data

Mar. 8, 2002 (JP) ............................ 2002-064361

(51) Int. Cl.[7] ............................ G09G 5/02; G09G 5/00

(52) U.S. Cl. ...................... 345/589; 345/619; 345/660; 345/671; 345/665

(58) Field of Search ................................ 345/660, 671, 345/678, 667, 668, 589, 619, 648, 661, 665, 345/669; 382/254, 260, 263

(56) References Cited

U.S. PATENT DOCUMENTS 6,407,747 B1 * 6/2002 Chui et al. .................. 345/660
6,411,305 B1 * 6/2002 Chui .......................... 345/660
6,556,213 B1 * 4/2003 Yamada ...................... 345/671
6,677,959 B1 * 1/2004 James ........................ 345/660
2002/0075285 A1 * 6/2002 Morrison .................... 345/660
2002/0080149 A1 * 6/2002 Alexander et al. .......... 345/634

OTHER PUBLICATIONS

The Knowledge Base Dictionary, Hansen Media Corp. 1994-2000.*

* cited by examiner

*Primary Examiner*—Sumati Lefkowitz
*Assistant Examiner*—Chante Harrison
(74) *Attorney, Agent, or Firm*—Gregory M. Doudnikoff; Dillon Yudell, LLP

(57) ABSTRACT

A technique is provided for improving visual recognition of letters, graphics, etc., in a portion of a displayed image that has been enlarged. An image display system includes an image display component for displaying on a screen an image based on image data, a region indicator component for permitting a region to be enlarged from the image to be selected and identified, a data modification component for modifying the portion of the image data corresponding to an enlarged display region so that the selected image is enlarged and displayed within the enlarged display region on the screen, and a brightness adjusting component for adjusting values instructing brightness of the corresponding image data part such that a contrast of the image within the enlarged display is higher than a contrast of the original image within the enlarged display region.

17 Claims, 10 Drawing Sheets

IMAGE DISPLAY DEVICE, IMAGE DISPLAY METHOD, AND IMAGE DISPLAY PROGRAM

BACKGROUND OF THE INVENTION

1. Field of the Invention

This invention relates to an image display device, image display method, and image display program wherein an image in a specified region on a displayed image is enlarged and displayed in an enlarged display region on the displayed image. More particularly, the present invention relates to a technique that can adjust the brightness of an image in a region to be enlarged so that the enlarged image has a higher contrast than the original image before being enlarged.

2. Description of the Related Art

Conventionally, exemplary known approaches through which an image in a specified region on a displayed image is enlarged in an enlarged display region on the displayed image include a utility called magnifier. As shown in FIG. 11, this utility displays, in an enlarged display region 112, an enlarged portion of an image 111 displayed on a screen of a computer.

In addition, there is a known function for improving visual recognition of an overall displayed image, which is called high contrast. As shown in FIG. 12, this involves improving visual recognition by changing colors of a background 121 and letters 122 to increase the contrast, or by increasing the size of the letters from a default value. However, no change is made in colors and so on of letters 124 rendered on a bitmap image 123, since bitmap images, widely used such as in web pages, are to be displayed as they are.

Published Unexamined Japanese Patent Application No. 7-334665 discloses an image display technique for enlarging a specific region of an image and reducing other regions surrounding the specific region based on image data, wherein the enlarged display region has a different display mode from the surrounding region. The display mode can be made different by emphasizing the luminance, changing the color, or displaying more detailed information in the specific region, or by displaying the specific region without any change and the surrounding region dimly.

However, with the above described magnifier utility, simply enlarging an image may not enough to improve visual recognition of letters and so on. In that case, using the above described high contrast function may rather hinder the recognition, since it changes the colors of an overall screen and causes the loss of original image information. Since letters, etc., on a bitmap image do not change, visual recognition of them is not improved. That is, the improvement of visual recognition is limited to that obtained by enlargement. In addition, using the technique of Published Unexamined Japanese Patent Application No. 7-334665 to emphasize the luminance, change the color, or display detailed information does not improve visual recognition of graphics in the enlarged display region, since the technique only facilitates differentiation of the enlarged display region from the surrounding region.

In view of these problems of conventional techniques, the object of this invention is to provide a technique for enlarging, in an enlarged display region, an image in a specified region to be enlarged to improve visual recognition of graphics such as in the enlarged image.

SUMMARY OF THE INVENTION

To achieve the above object, an image display device according to the invention comprises an image display means for displaying on a screen an image based on image data; a region indicator means for instructing an enlarged region to be subjected to an enlarged display in the displayed image; and a data modification means for modifying data parts corresponding to an enlarged display region within the image data so that an image within the enlarged region is to be enlarged and displayed in a predetermined enlarged display region on the screen, wherein the data modification means further comprises a brightness adjusting means for adjusting values instructing brightness of the corresponding image data part such that a contrast of the image within the enlarged display becomes higher than a contrast of an original image within the enlarged region.

An image display method according to the invention comprises an image display step of displaying on a screen an image based on image data; a region indication step of instructing an enlarged region to be subjected to an enlarged display in the displayed image; and a data modification step of modifying data parts corresponding to an enlarged display region within the image data so that an image within the enlarged region is to be enlarged and displayed in a predetermined enlarged display region on the screen, wherein the method further comprises a brightness adjusting step of adjusting values instructing brightness of the corresponding image data part such that a contrast of the image within the enlarged display becomes higher than a contrast of an original image within the enlarged region.

An image display program according to the invention causes a computer to function as an image display means for displaying on a screen an image based on image data; a region indicator means for instructing an enlarged region to be subjected to an enlarged display in the displayed image; and a data modification means for modifying data parts corresponding to an enlarged display region within the image data so that an image within the enlarged region is to be enlarged and displayed in a predetermined enlarged display region on the screen, wherein the data modification means further comprises a brightness adjusting means for adjusting values instructing brightness of the corresponding image data part such that a contrast of the image within the enlarged display becomes higher than a contrast of an original image within the enlarged region.

In these embodiments, the position of the enlarged display region may be fixed at a predetermined place on the screen independent of the position of the enlarged region, or may be changed depending on the position of the enlarged region in a fixed positional relationship with the enlarged region. In the latter case, the enlarged region may be either inside or outside the enlarged display region. A pointing device may be used to indicate a point having a certain relationship with the enlarged region of a fixed shape and dimension, or to indicate two points that define the rectangular enlarged region.

In these embodiments, when an image is displayed on the screen and if the enlarged region is indicated, a portion corresponding to the enlarged display region is modified in the image data used for image display. This modification is made so that the original image in the enlarged region is enlarged and displayed in the enlarged display region. Here, the values of brightness of the corresponding image data portion are also changed so that the enlarged image has a higher contrast than the original image before being enlarged. Therefore, the enlarged image is displayed in the enlarged display region with a higher contrast than that of the original image, which provides improved recognition of letters and so on in the enlarged image.

In these embodiments, the values of brightness may be adjusted by changing each value of brightness using a function represented by a predetermined line (a straight line or a curve) on a graph where a horizontal axis indicates values of brightness before change and a vertical axis indicates values of brightness after change. Alternatively, the brightness can be adjusted by changing each value of brightness in other equivalent manners, such as using a matching table that contains values of brightness before change and their corresponding values after change.

If the image data is in RGB format, the values of brightness may be RGB values of the image data. In this case, the values of brightness may be adjusted by performing the above described change on the RGB values of each image data item concerned.

The values of brightness are preferably adjusted in consideration of the brightness of the original image in the enlarged region. For example, instead of using the above described function as it is, a function may be used that is obtained by shifting the above described function parallel in the direction of the horizontal axis based on the average value of brightness of the image data for the original image in the enlarged region.

An exemplary line representing the above described function may be a line that has a straight segment having a gradient equal to or above 1, and this straight segment may be obtained in such a manner that a function line having a gradient of 1 and causing no change in the values of brightness is rotated about a point on the function line corresponding to the midpoint of the values of brightness. Another exemplary line that may be used has segments corresponding to both ends of the range of the values of brightness where the gradient is above 0 and below 1, and a segment in between these segments where the gradient is equal to or above 1.

DESCRIPTION OF THE PREFERRED EMBODIMENT

Figure 1:
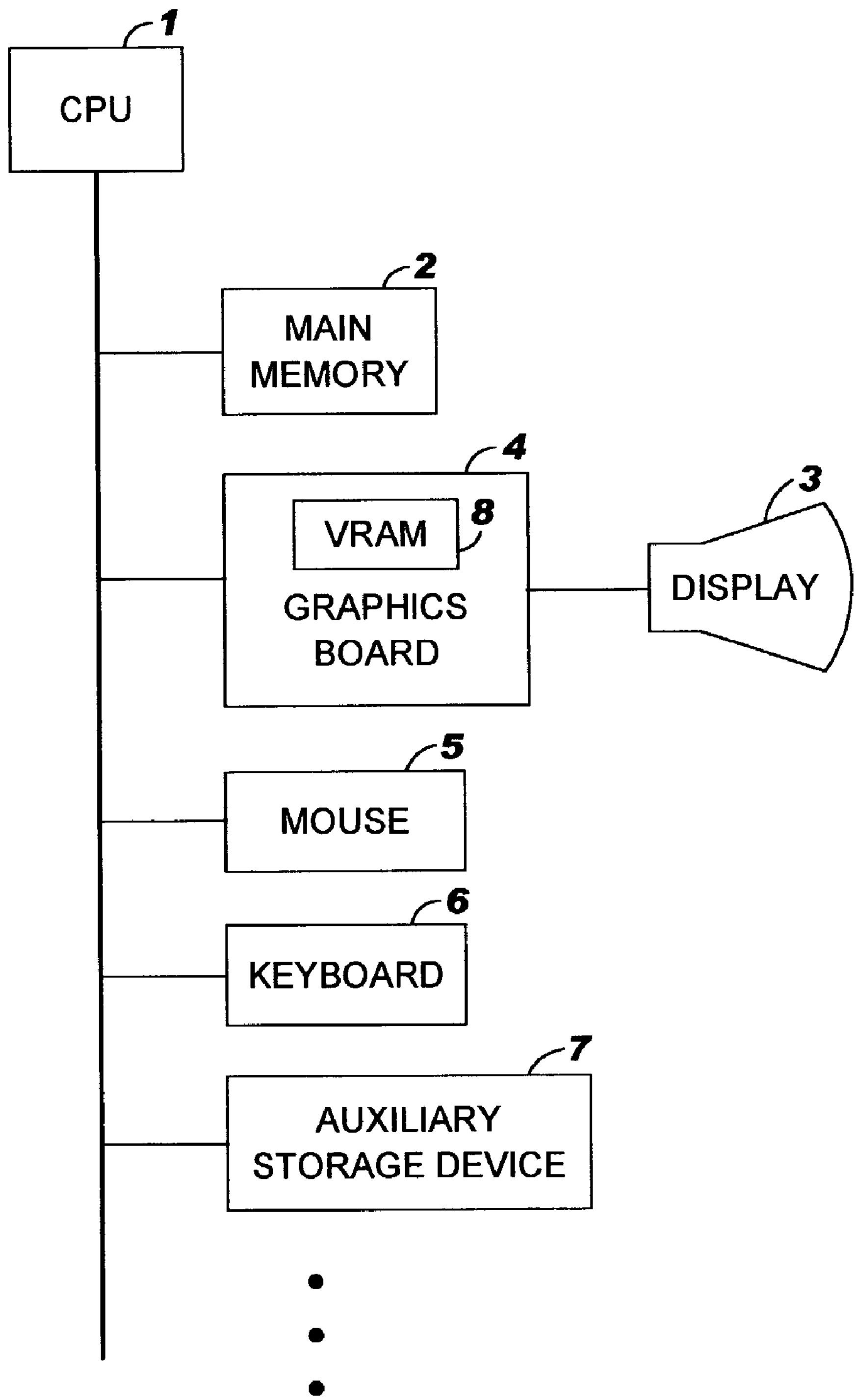
FIG. 1 is a block diagram showing a configuration of a computer that employs an image display device according to an embodiment of the invention.

FIG. 1 is a block diagram showing a configuration of a computer that employs an image display technique according to an embodiment of the invention. As shown in this figure, the computer includes a CPU 1 for performing operations according to programs, main memory 2 for storing programs and data that are directly accessed by the CPU 1, a display 3 for displaying results of processing performed by the CPU 1, a graphics board 4 for enabling display on the display 3 under the control of the CPU 1, a mouse 5 for moving a mouse pointer displayed on the display 3 to give instructions about the position of the mouse pointer to the computer, a keyboard 6 for inputting data and instructions, and an auxiliary storage device 7 for storing programs and data. The auxiliary storage device 7 stores various programs for outputting images on the display 3, as well as a magnifier program for providing enlarged display of a portion of a displayed image.

The graphics board 4 includes video memory (VRAM) 8 for storing image data used for image display on the display 3. In an on-screen area in the video memory 8, image data with color information for each dot of the display 3 is stored in an address location for the dot. The graphics board 4 periodically sends the image data in the on-screen area to the display 3 for displaying images. The color information for each dot is composed of R (red), G (green), and B (blue) components, each of which having a value from 0 to 255 indicating a degree of brightness or intensity of the color.

Figure 2:
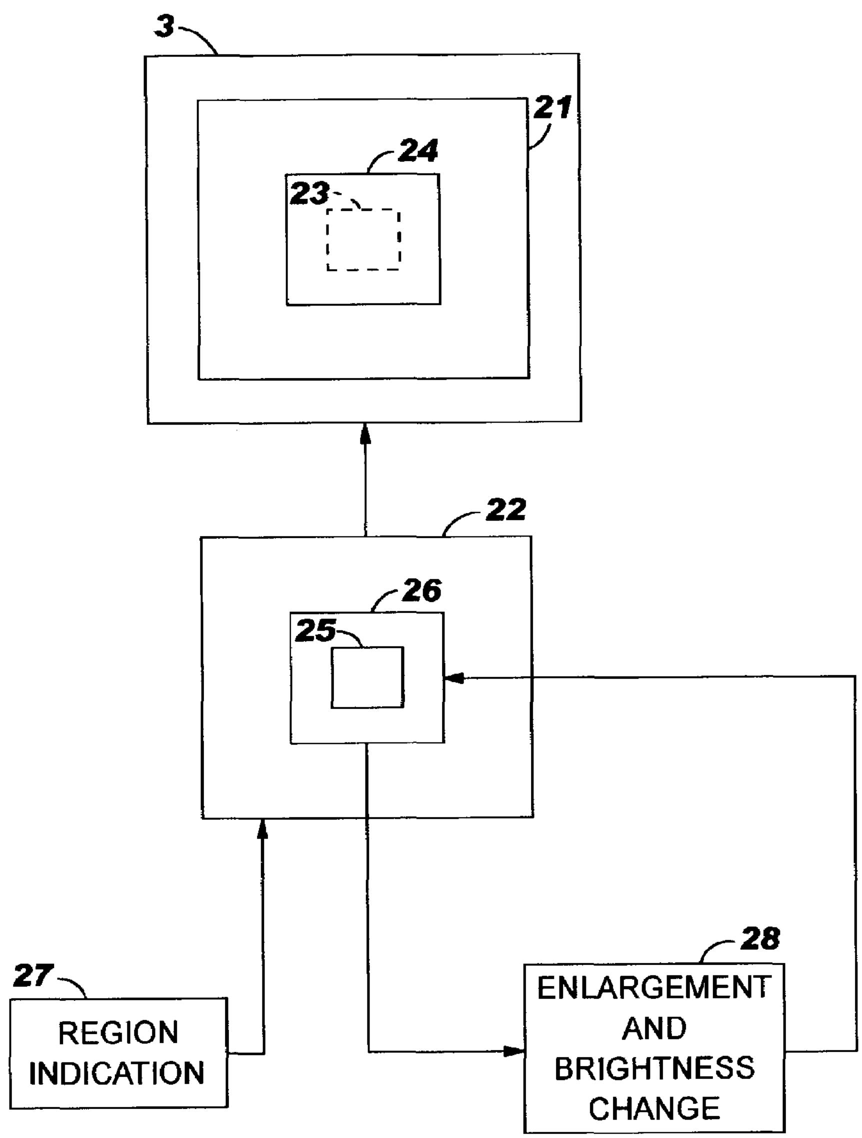
FIG. 2 is a block diagram which shows the image display functionality as applied in the computer shown in FIG. 1.

FIG. 2 shows the principle of image display in this computer. In this figure, reference numeral 21 denotes a screen of the display 3, reference numeral 22 denotes image data in the video memory 8 used for an image display on the screen 21, reference numeral 23 denotes a region to be enlarged on the screen 21, reference numeral 24 denotes an enlarged display region used for enlarged display of an image in the image region to be enlarged 23, the reference numeral 25 denotes a portion of the image data 22 for the image region to be enlarged 23, reference numeral 26 denotes a portion of the image data 22 for the enlarged display region 24, and the reference numeral 27 denotes a region indicator component for indicating the image region to be enlarged 23 on the screen 21. Reference numeral 28 denotes a data modification component for modifying the image data portion 26 so that the image in the region to be enlarged 23 is enlarged in the enlarged display region 24. The data modification component 28 also changes the brightness of the corresponding image data for image in the region to be enlarged 23 so that the enlarged image has a higher contrast than the original image before being enlarged. The region indicator component 27 and the data modification component 28 includes an enlarged display program, as well as the mouse 5, the CPU 1, and the main memory 2 shown in FIG. 1. The region to be enlarged 23 and the enlarged display region 24 are in a fixed positional relationship with each other so that they have the same center. Therefore, when an enlarged image is displayed in the enlarged display region 24, the original image in the region to be enlarged 23 is hidden by the enlarged image. A user may indicate the position of the region to be enlarged 23 by indicating the position of the enlarged display region 24. The region indicator component 27 may receive an indication of the region to be enlarged 23 or the enlarged display region 24 in various known techniques. For example, the user may indicate the position by pointing and selecting with the mouse 5, moving a pointer, or dragging.

In this configuration, when an image is displayed on the screen 21, and if the magnifier program is started and the position of the region to be enlarged 23 is indicated by the region indicator component 27, the image data portion 26 for the enlarged display region 24 is modified by the data modification component 28. This modification is made so that the original image represented by the image data portion 25 for the region to be enlarged 23 is enlarged and displayed in the enlarged display region 24. That is, the image data portion 25 is modified into an enlarged data image by increasing the number of its pixels, and the image data portion 26 is overwritten by the enlarged image data. Here, the values of brightness of the image data, i.e., the RGB values, are also changed so that the image provided from the generated image data portion 26 has a higher contrast than the image represented by the image data portion 25 before being enlarged. This increases the contrast of the enlarged image in the enlarged display region 24 and improves visual recognition of letters and so on. Nevertheless, no change is made to the portion outside of the enlarged display region 24 on the screen 21. Thus, the user can enlarge and view the displayed image on the screen 21 in a natural manner as if the user enlarges the image on a paper with a real magnifier and illuminates the enlarged image to view it with an increased contrast.

When the enlarged display region 24 is moved, the portion of the display on the screen 21 that has been hidden by the enlarged display region 24 and that corresponds to the amount of movement has to be displayed in the original state without being enlarged. Therefore, the corresponding portion of the image data 22 has to be recovered. Thus, the image data for the recovery has to be saved before the corresponding portion becomes hidden by the enlarged display region 24, i.e., before it is overwritten by the image data portion 26. The image data portion 25, from which the image data portion 26 is generated, may be extracted from such saved image data.

Figure 3:
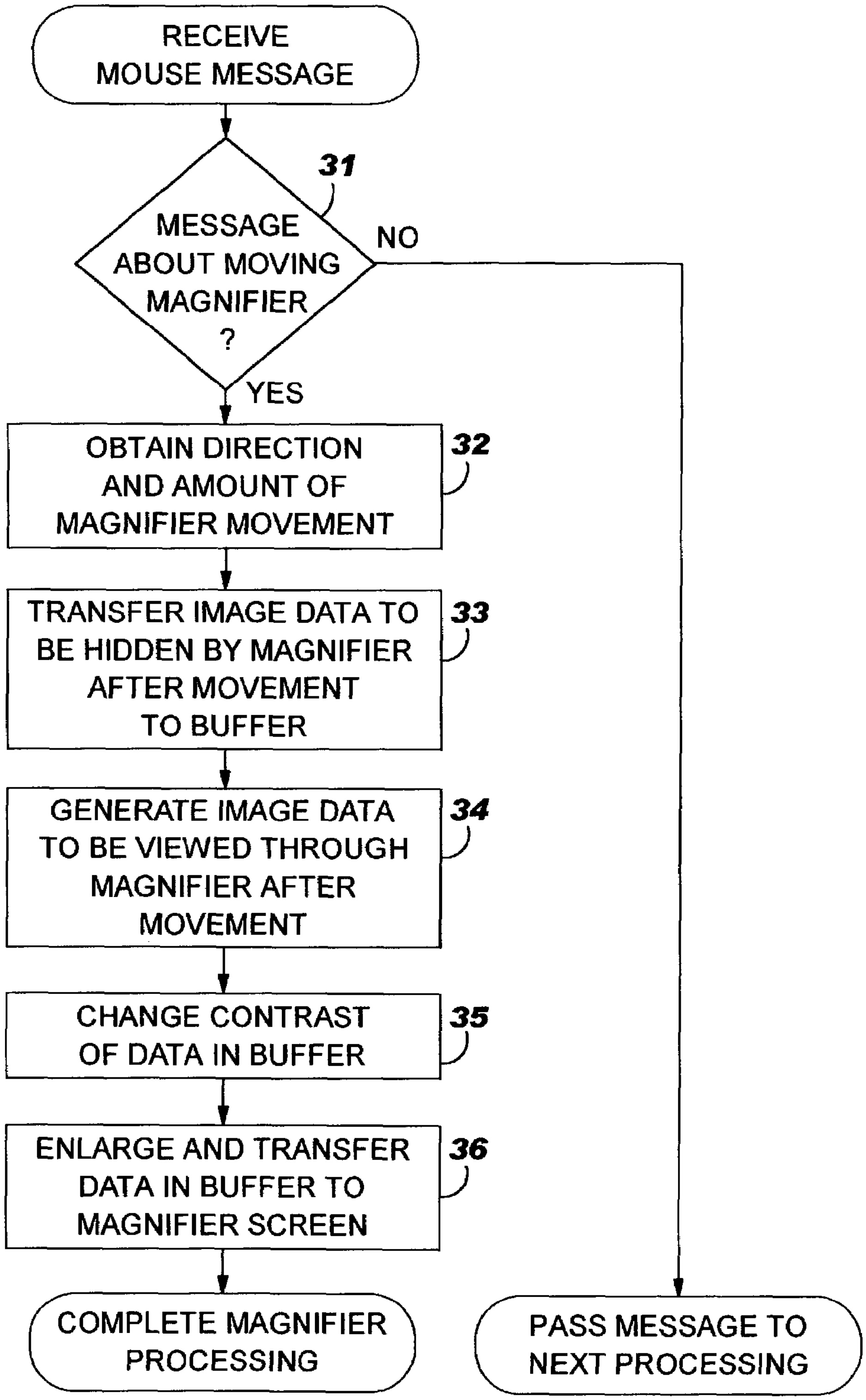
FIG. 3 is a flowchart showing magnifier processing in a magnifier program according to an embodiment operable in the computer shown in FIG. 1.

FIG. 3 is a flowchart showing magnifier processing in the magnifier program. In this program, the enlarged display region 24 and the region to be enlarged 23 are in a fixed positional relationship with each other and move synchronously by the same amount and in the same direction following the position indication. The region to be enlarged 23 and the enlarged display region 24 have a predetermined size according to the settings. After the magnifier program is started, the magnifier processing of FIG. 3 is performed when a mouse message is generated.

In particular, when a mouse message is received, the computer determines whether the message is about moving the magnifier or not according to the magnifier program in Step 31. The magnifier corresponds to the enlarged display region 24 where the enlarged display is to be provided. The mouse message about moving the magnifier corresponds to the indication of the position of the region to be enlarged 23 or the enlarged display region 24. If the mouse message is not about moving the magnifier, the message is passed to another process in the magnifier program, such as one for increasing the size of the magnifier, i.e., the dimension of the enlarged display region 24, or changing the scaling factor for the enlarged display.

If it is determined that the mouse message is about moving the magnifier in Step 31, the direction and amount of the magnifier movement are obtained based on the mouse message in Step 32. Then, in Step 33, the image data for the region to be hidden by the magnifier after the movement, i.e., the image data to be overwritten by the image data portion 26 is transferred to a buffer to be saved.

Then, in Step 34, the image data to be viewed through the magnifier is generated in the buffer. That is, the original image data for the region to be enlarged 23 and displayed in the enlarged display region 24 is generated. This image data may be generated using the image data saved in Step 33.

Then, in Step 35, contrast change is performed on the image data generated in the buffer in Step 34. In this processing, the values of brightness of the image data are changed so that the enlarged image has a higher contrast than the original image in the region to be enlarged 23 before being enlarged. This is performed by changing the values of brightness of each image data item using a function represented by a predetermined line on a graph where the horizontal axis indicates values of brightness before change and the vertical axis indicates values of brightness after change. The image data items represent color information for each dot on the screen as a mixture of R (red), G (green), and B (blue), each represented in 256 gradations from 0 to 255. Therefore, each RGB value of the image data items concerned is changed using the function. Alternatively, the brightness change may be more precisely performed by deriving the value of brightness from each RGB gradation value for each dot or pixel and changing that value. However, this would considerably increase the computational complexity.

Figure 6:
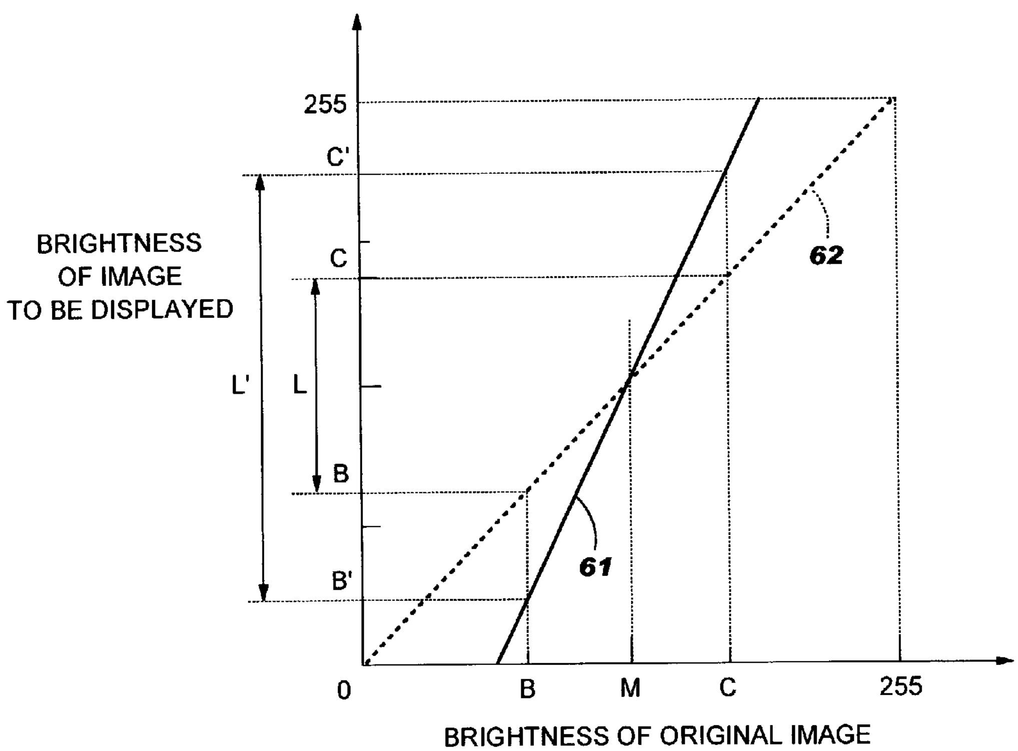
FIG. 6 is a graph showing the principle of contrast change in the processing shown in FIG. 3.

FIG. 6 is a graph showing the principle of the contrast change. The horizontal axis indicates values of brightness before change and the vertical axis indicates values of brightness after change in RGB values respectively. In this figure, a line 61 represents the function used for the change. An RGB value before change is assigned to this function to yield a function value, which is the RGB value after change. A line 62 represents a function where no change is made, and the line 61 has a segment of the line 62 rotated about the point M on the line 62 so that the gradient becomes more than 1, wherein the point M corresponds to the midpoint of the RGB values. For example, as shown in this figure, if the RGB value of a background image is B and the RGB value of letters is C in the image data portion 25 before change, their RGB values after change will be B' and C', respectively. Therefore, the difference between these RGB values will increase from L (=C−B) to L' (=C'−B'). In this manner, changing the RGB values of all dots that form the background and the letters can increase their contrast and improve visual recognition of the letters.

Once the contrast change is completed, in Step 36, the image data with the changed contrast in the buffer is enlarged and transferred to the video memory 8, where the image data is stored in the data image portion 26 for the enlarged display region 24. Here, the magnifier is moved by the amount of movement obtained in Step 32, and the original image hidden before the movement must be displayed again. Therefore, the image data to be displayed again is also extracted from the image data saved in Step 33 and returned to the corresponding portion in the image data 22. Thus, the magnifier processing in the magnifier program is completed.

Figure 9:
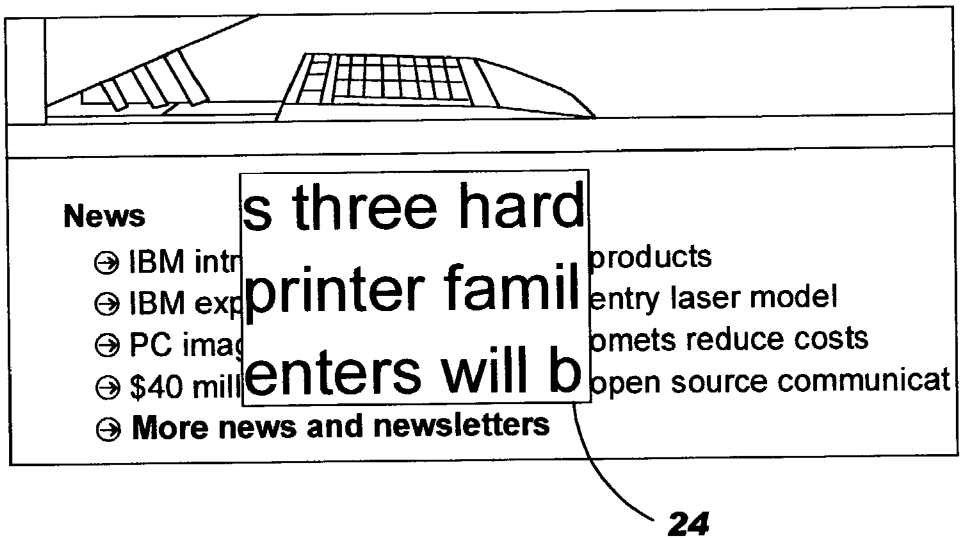
FIG. 9 shows a state of a screen on which enlarged display is provided by the magnifier processing shown in the flow chart of FIG. 3.
Figure 10:
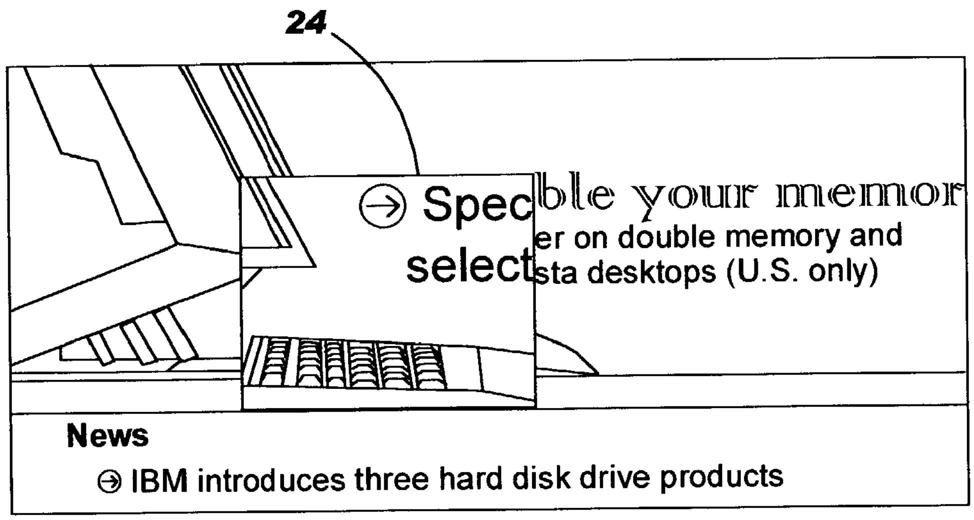
FIG. 10 shows another state of a screen on which enlarged display is provided by the magnifier processing shown in FIG. 3.
Figure 11:
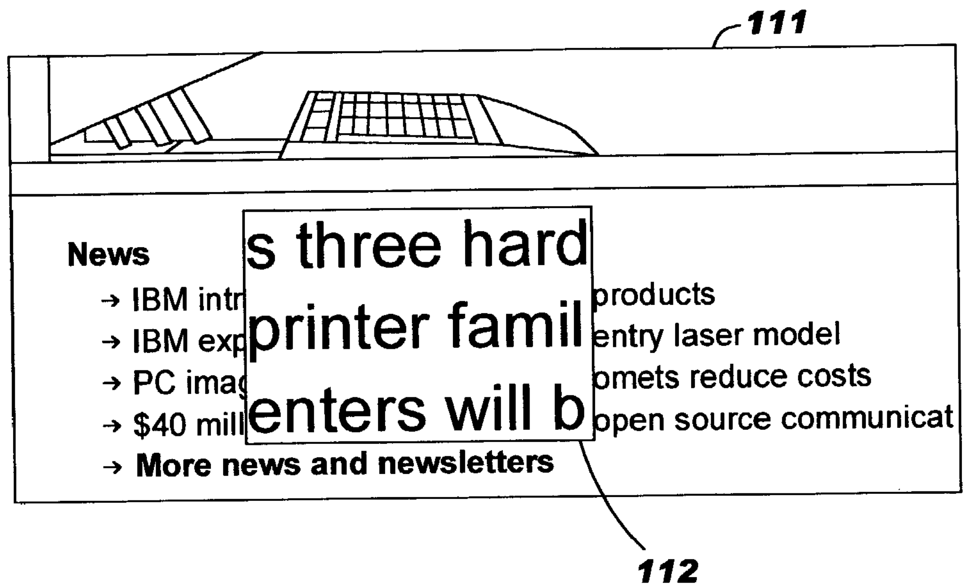
FIG. 11 shows a state of a display screen according to the prior art.
Figure 12:
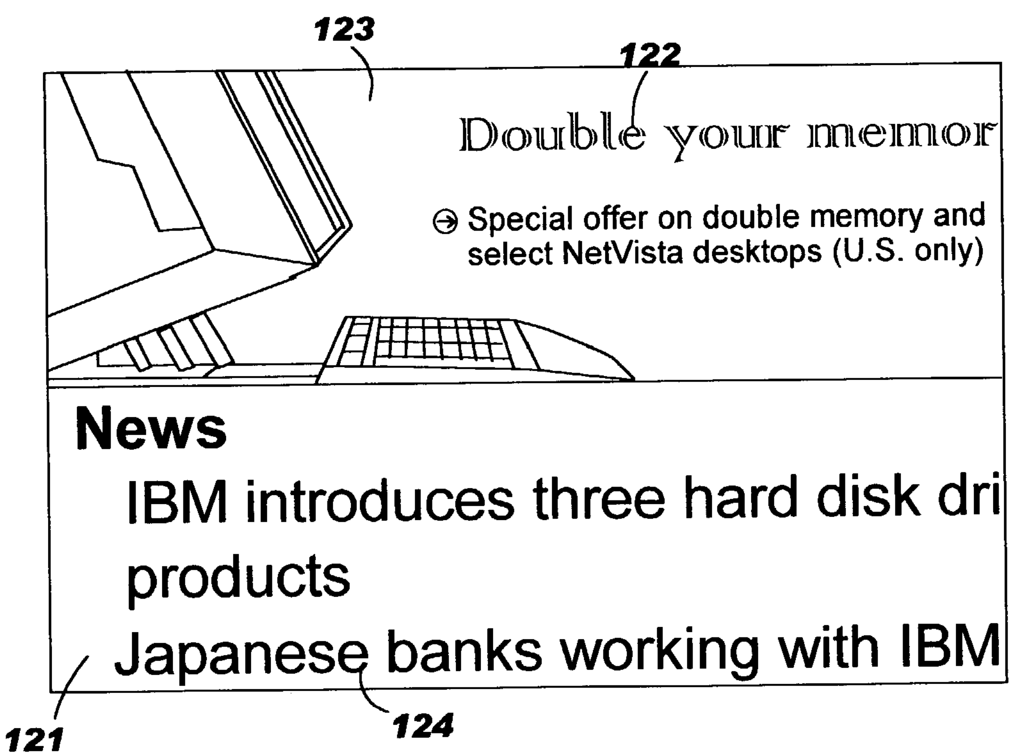
FIG. 12 shows a state of a display screen according to the prior art.

FIGS. 9 and 10 show images on the screen 21 enlarged by this magnifier processing. Original image data for the image display of FIGS. 9 and 10 is the same as that for FIGS. 11 and 12 of the prior art. As shown in FIG. 9, the enlarged image in the now enlarged region 24 has an improved contrast between the background and the letters, and visual recognition of the letters has been improved, as compared to the enlarged image in the enlarged display region 112 in FIG. 11 of the prior art. Further, FIG. 10 shows that the letters on the bitmap image also have improved contrast to the background, and visual recognition of the letters has been improved in the enlarged image in the enlarged region 24, as compared to the conventional example in FIG. 12. In addition, since this processing makes no change in images in other regions, it does not compromise image information from those regions.

If the position indicator which indicates the region to be enlarged 23 is continuously moved, the mouse message about moving the magnifier is successively received, so that the processing from Steps 31 to 36 in FIG. 3 is repeated. Therefore, the magnifier is displayed to be moving with the movement of the mouse 5 indicating the position on the screen 21. During this movement, the enlarged display region 24 of the magnifier continuously displays enlarged and higher-contrast versions of the original images from the region to be enlarged 23 corresponding to the positions where the mouse 5 is moved.

Figure 4:
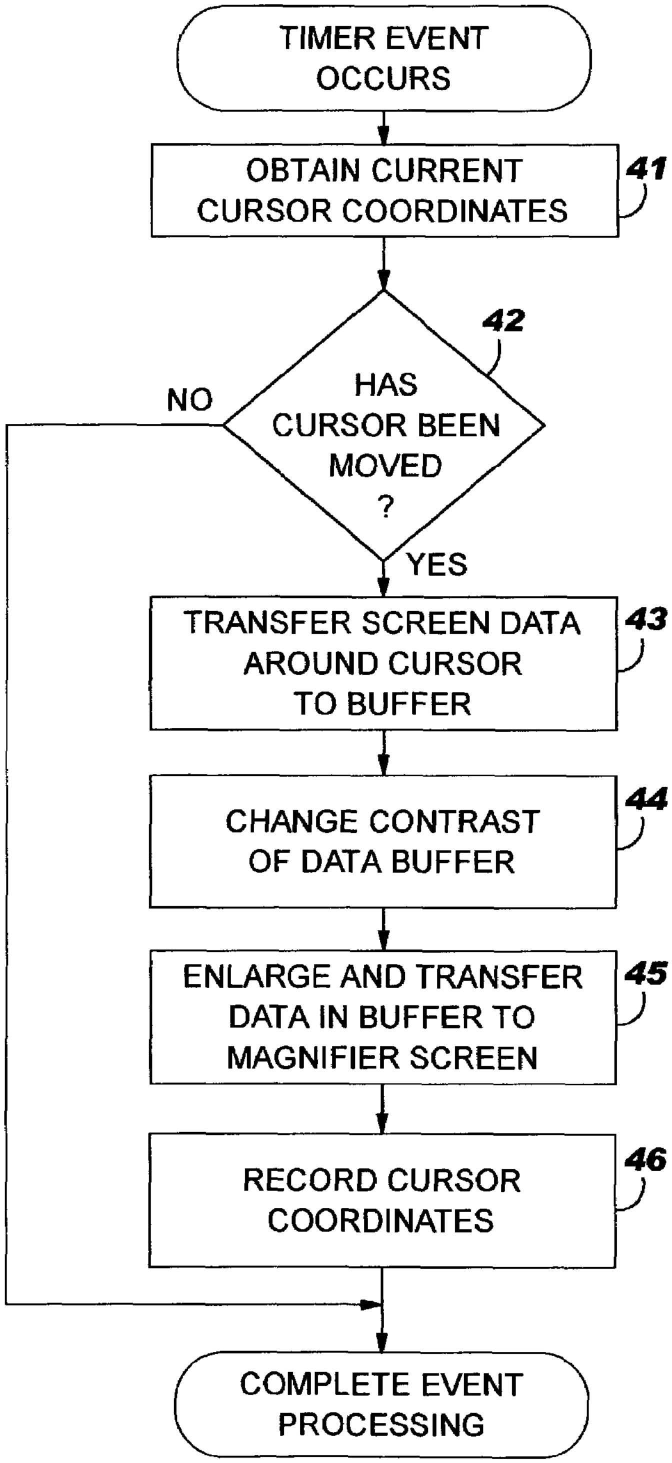
FIG. 4 is a flowchart showing magnifier processing in another magnifier program according to an embodiment operable in the computer shown in FIG. 1.

FIG. 4 is a flowchart showing magnifier processing in another magnifier program according to an embodiment operable in the computer shown in FIG. 1. In this case, the enlarged display region 24 is fixed to a preset position on the screen 21, and only the region to be enlarged 23 can be moved or selected by indicating its position. Generally, the region to be enlarged 23 is outside the enlarged display region 24. The position of the region to be enlarged 23 may be indicated in the same manner described above, such as moving the mouse, wherein the position of the mouse cursor (mouse pointer) may correspond to the position of the region to be enlarged 23 and may be used as a guide to indicate the position.

After the magnifier program is started, the processing of FIG. 4 is performed each time a timer event occurs at a certain interval. In particular, when a timer event occurs, current mouse cursor coordinates are firstly obtained in Step 41, and it is determined whether the mouse cursor has moved or not in Step 42. This determination may be made by comparing mouse cursor coordinates recorded in Step 46 (as described below) in the previous magnifier processing to the mouser cursor coordinates obtained this time. If it is determined that the mouse cursor has not been moved, the magnifier processing terminates. In this case, the displayed content in the enlarged display region 24 does not change and is kept as it has been.

If it is determined that the mouse cursor has been moved in Step 42, image data for the region to be enlarged 23 surrounding the mouse cursor is extracted from the image data 22 and transferred to the buffer in Step 43. Then, in Step 44, contrast change is performed on the image data transferred to the buffer in the same manner as in Step 35 of FIG. 3.

Then, in Step 45, the image data with the changed contrast in the buffer is enlarged and stored in the portion 26 for the enlarged display region 24 in the video memory 8. Therefore, the image in the enlarged display region 24 becomes the enlarged and higher-contrast version of the image in the region to be enlarged 23 moved by the amount of the mouse cursor movement. Thus, the magnifier processing is completed.

If the mouse cursor indicating the position of the region to be enlarged 23 is moved and therefore the desired location (indicated position) of the region to be enlarged 23 has moved, the mouse cursor movements are detected in Step 42 by comparing the location just found in Step 41 with those previously recorded in Step 46 after the time interval from the prior processing has passed. In this case, the processing of Steps 43 to 46 in FIG. 4 is repeated. The enlarged image is thus changed in the enlarged display region 24 as the movement of the mouse cursor indicates a change of the region to be enlarged 23. Here, all or part of the region to be enlarged 23 may overlap the enlarged display region 24, depending on the mouse cursor position. In that case, the overlapping portion in the region to be enlarged 23 does not need to be enlarged again.

Figure 5:
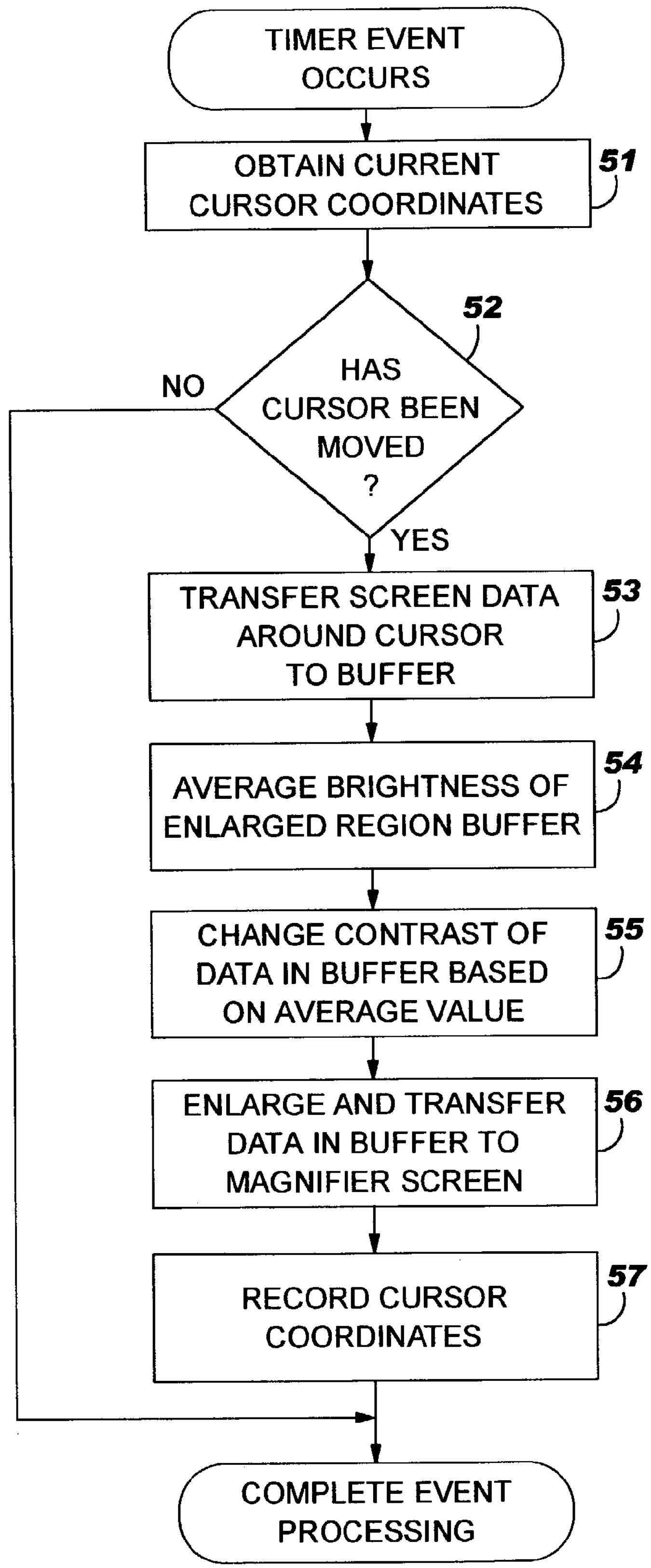
FIG. 5 is a flowchart showing magnifier processing in yet another magnifier program according to an embodiment operable in the computer shown in FIG. 1.

FIG. 5 is a flowchart showing magnifier processing in yet another magnifier program according to an embodiment operable in the computer shown in FIG. 1. This processing addresses the cases where an image in the region to be enlarged 23 is too bright or too dark as a whole due to its uneven brightness. This magnifier processing determines the function used for the contrast change in consideration of the brightness of the original image in the region to be enlarged 23 before being enlarged. Therefore, Step 54 is added to the processing shown in FIG. 4, and the processing in Step 44 in FIG. 4 is modified. The modified step is Step 55. The processing in Steps 51 to 53, 56, and 57 is the same as Steps 41 to 43, 45, and 46 in FIG. 4.

In particular, after the image data for the region to be enlarged 23 is transferred to the buffer in Step 53, the brightness of the transferred image data in the buffer is averaged in Step 54. Here, the value of brightness for each dot is not determined, but the RGB values of the transferred image data are simply summed and averaged. The average is used as the average value of brightness. That is, the RGB values of each image data item are extracted and averaged based on the original image data portion 25 for the region to be enlarged 23.

Figure 7:
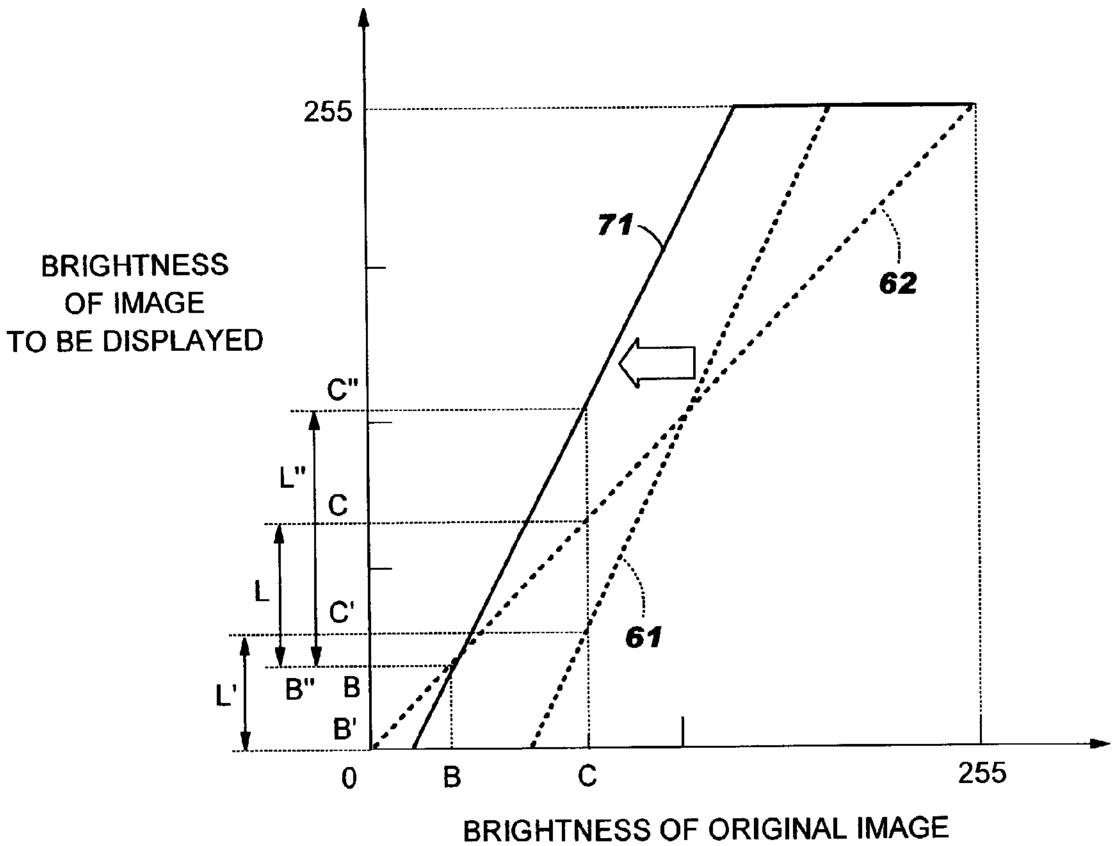
FIG. 7 is a graph showing the principle of contrast change in the processing shown in FIG. 5.

In consideration of the obtained average value of brightness, contrast change is performed on the transferred image data in the buffer in Step 55. FIG. 7 is a graph showing the principle of the change. The values on the horizontal axis and the vertical axis are similar to those in FIG. 6. As shown in FIG. 7, when the values of the brightness of a background B and the brightness of letters C are small, the brightness of the background B would be out of the brightness range of a slanted line 61 and would fall within the range where any brightness is changed to 0, i.e., causes black crushing, according to the contrast change of FIG. 6. Then, the difference between the brightness of the letters and the background after change L' (=C'−B') would be smaller than that before change L (=C−B), providing a decreased contrast. Therefore, a function represented by a line 71, which is obtained by shifting the line 61 parallel to the left, is used as the function for the contrast change. The amount of the parallel shift is determined to minimize black crushing or white crushing based on the average value determined in Step 54. That is, the value of a parameter that determines the function of the line 71 is defined based on the average value of brightness. In this manner, the brightness of the background B is changed to B" and the brightness of the letters C is changed to C". Therefore, the difference between the brightness of the background and the letters is L" (=C"−B"), which is greater than the difference L before change and provides an increased contrast.

Figure 8:
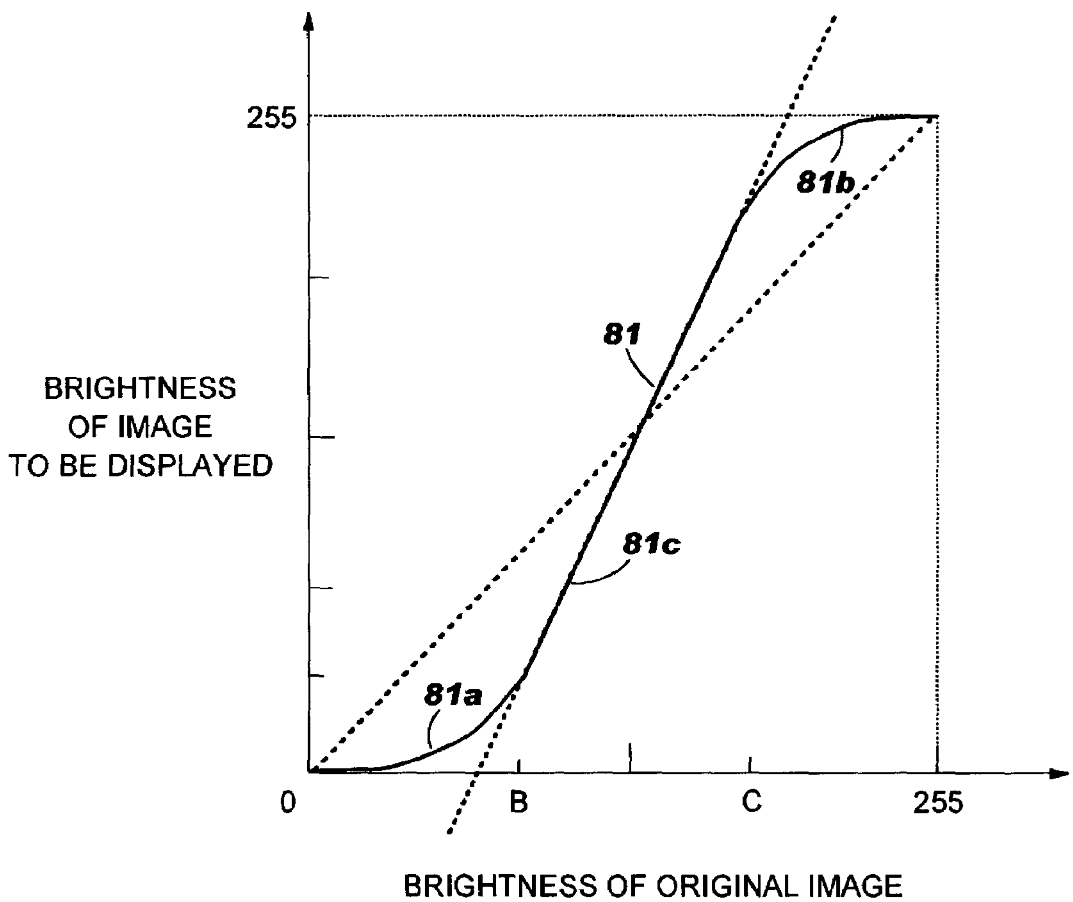
FIG. 8 is a graph showing another function that may be used for contrast change in the magnifier processing shown in the flow charts of FIGS. 3 to 5.

FIG. 8 is a graph showing another function that may be used for the contrast change in the above described magnifier processing of FIGS. 3 to 5. In this figure, a line 81 representing the function comprises segments 81*a* and 81*b* where the gradient is above 0 and below 1, and a segment 81*c* in between the segments 81*a* and 81*b* corresponding to both ends of the range of the values of brightness where the gradient is equal to or above 1. According to this function, the values of the brightness of letters C and the brightness of a background B falling within the intermediate segment 81*c* can increase the contrast between them as with the case of FIG. 6. Further, the values of brightness of portions other than the letters and the background falling within the end segment 81*a* or 81*b* can also maintain their brightness information to some extent to prevent black crushing or white crushing.

The invention is not limited to the above described embodiments but may be implemented with appropriate modifications. For example, the region to be enlarged and the enlarged display region may be circles or ovals, rather than rectangles as described. The region to be enlarged may be indicated or selected with other pointing devices or a keyboard, rather than the mouse as described. Besides mere brightness as described, chroma or color phase may also be changed. In the above described embodiment, the average value of brightness is calculated by summing the RGB values in overall image data for the enlarged region. Instead, the average value of brightness may be calculated only for part of the enlarged region, such as image data portion at the center or image data portions at certain intervals, and then the value may be used for determining the function. Further, the invention may be applicable to image data in other format, such as YUV format, rather than RGB format as described. In that case, the value of luminance of image data may be used as the value of brightness of the image data.

As described above, according to the invention, the value of brightness of corresponding image data is adjusted so that an enlarged image has a higher contrast than the original image in an enlarged region. Thus, the invention may improve visual recognition of letters and so on in the enlarged image.

What is claimed is:

1. In a computing environment, an image display system for permitting a portion of an image to be enlarged, said system comprising:

image display means for displaying on a screen an image based on image data;

region indicator means for identifying a region of the image to be enlarged;

brightness adjusting means for adjusting brightness values of a portion of the image which corresponds to the region to be enlarged such that a contrast of the identified region when displayed within an enlarged display area on the screen is higher than a contrast of an original image within the enlarged display region, wherein said brightness adjusting means adjusts the values of brightness by changing each value of brightness using a function represented by a predetermined line on a graph where horizontal axis indicates values of brightness before change and a vertical axis indicates values of brightness after change, and wherein said predetermined line has a straight segment having a gradient equal to or greater than 1, said straight segment being obtained in such a manner that a function line having a gradient of 1 and causing no change in said values of brightness is rotated about a point on the function line corresponding to the midpoint of said values of brightness; and data modification means for modifying a portion of the image data which corresponds to the enlarged display area within the image data so that the identified region of the image, after enlargement within the enlarged display region is enlarged and displayed in the enlarged display region on the screen.

2. The image display system according to claim 1, wherein the image data is in RGB format, and said brightness adjusting means adjusts the values of brightness by changing RGB values for each item in the identified region.

3. The image display device according to claim 1, wherein said brightness adjusting means adjusts the values of brightness in consideration of the brightness of the original image in said enlarged region.

4. The image display system according to claim 1, said brightness adjusting means uses a function obtained by shifting said function parallel in the direction of said horizontal axis based on an average value of brightness of the image data for the original image in said enlarged region.

5. The image display system according to claim 1, wherein said predetermined line has segments corresponding to both ends of the range of the values of brightness where the gradient is above 0 and below 1, and a segment in between said segments where the gradient is equal to or above 1.

6. A method for enlarging a selected region of an image displayed on a screen, display method comprising the steps of:

displaying on a screen an image based on image data;

identifying a region to be enlarged from within the displayed image and identifying a first portion of the image data which corresponds to the region to be enlarged and a second portion of the image data which corresponds to a enlarged display region for the region to be enlarged;

modifying the first image data portion and the second image data portion corresponding to the enlarged display region within said image data so that the first image data portion is enlarged for display in the enlarged display region on the screen;

adjusting values instructing brightness of the first image data portion such that a contrast of a resulting image within the enlarged display region is higher than a contrast of an original image within the enlarged region, wherein said adjusting comprises adjusting the values of brightness by changing each value of brightness using a function represented by a predetermined line on a graph where a horizontal axis indicates values of brightness before change and a vertical axis indicates values of brightness after change, and wherein the predetermined line has a straight segment having a gradient equal to or above 1, the straight segment being obtained in such a manner that a function line having a gradient of 1 and causing no change in the values of brightness is rotated about a point on the function line corresponding to the midpoint of the values of brightness; and displaying the enlarged and brightness adjusted image corresponding to the second data image portion in the enlarged display region.

7. The method according to claim 6, wherein said image data is in RGB format, and said adjusting step comprises adjusting the values of brightness by changing RGB values of each image data item concerned.

8. The method according to claim 6, wherein said adjusting step further comprises adjusting the values of brightness in consideration of the brightness of the original image in the enlarged display region.

9. The method according to claim 6, wherein said adjusting step comprises adjusting the values of brightness by changing each brightness value, using a function obtained by shifting the function parallel in the direction of said horizontal axis based on an average value of brightness of the image data for the original image in the enlarged region.

10. The image display method according to claim 6, wherein the predetermined line has segments corresponding to both ends of the range of the values of brightness where the gradient is above 0 and below 1, and a segment in between the segments where the gradient is equal to or above 1.

11. A computer readable medium that contains computer readable code that causes a computer to enlarge and enhance a portion of an image displayed on a screen, said computer readable code comprising:

first code means for displaying on a screen an image based on image data;

second code means for identifying a region to be enlarged in said displayed image and displayed in an enlarged display region, the identified region being within the enlarged display region;

third code means for modifying first image data parts corresponding to the enlarged display region within said image data so that the identified region is enlarged for display in the enlarged display region on said screen;

fourth code means for adjusting values instructing brightness of a portion of the first image data parts corresponding to the identified region such that a contrast of the adjusted portion of the first image data parts becomes higher than a contrast of an original image within said enlarged display region, wherein said fourth code means adjusts the values of brightness by changing each value of brightness using a function represented by a predetermined line on a graph where a horizontal axis indicates values of brightness before change and a vertical axis indicates values of brightness after change, and wherein the predetermined line has a straight segment having a gradient equal to or above 1, the straight segment being obtained in such a manner that a function line having a gradient of 1 and causing no change in the values of brightness is rotated about a point on the function line corresponding to the midpoint of the values of brightness; and fifth code means for displaying the enlarged and brightness adjusted identified image in the enlarged display region.

12. The computer readable medium according to claim 11, wherein said image data is in RGB format, and said fourth code means adjusts the values of brightness by changing RGB values of each image data item concerned.

13. The computer readable medium according to claim 11, wherein said fourth code means adjusts the values of brightness in consideration of the brightness of the original image in the enlarged region.

14. The computer readable medium according to claim 11, wherein instead of using said function, said fourth code means uses a function obtained by shifting said function parallel in the direction of the horizontal axis based on the average value of brightness of the image data for the original image in the enlarged region.

15. The computer readable medium according to claim 11, wherein the predetermined line has segments corresponding to both ends of the range of said values of brightness where the gradient is above 0 and below 1, and a segment in between said segments where the gradient is equal to or above 1.

16. The computer readable medium according the claim 11, further comprising:

sixth code means for storing an original portion of the image data corresponding to the enlarged display region; wherein said third code means and said fourth code means utilizes the stored original portion of the image data to change the displayed image if the identified region to be enlarged changes.

17. The computer readable medium according to claim 11, wherein said second coded means re-identifies the region to be enlarged at predetermined time intervals, and, if the identified region of the image to, be enlarged has changed, applying said third and fourth code means for the changed region of the image to be enlarged.

* * * * *